(12) United States Patent
Loprieno et al.

(10) Patent No.: US 8,279,891 B2
(45) Date of Patent: Oct. 2, 2012

(54) TECHNIQUES FOR ETHERNET OPTICAL REACH IMPROVEMENT

(75) Inventors: Gilberto Loprieno, Milan (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 373 days.

(21) Appl. No.: 12/638,763

(22) Filed: Dec. 15, 2009

(65) Prior Publication Data

US 2011/0142069 A1    Jun. 16, 2011

(51) Int. Cl.
*H04J 3/22* (2006.01)
(52) U.S. Cl. ........................................ 370/466
(58) Field of Classification Search ............ None
See application file for complete search history.

(56) References Cited

U.S. PATENT DOCUMENTS

| | | | | |
|---|---|---|---|---|
| 6,400,730 | B1* | 6/2002 | Latif et al. ................ | 370/466 |
| 7,114,009 | B2* | 9/2006 | Jones et al. ................ | 709/250 |
| 7,508,800 | B1* | 3/2009 | Deng ........................ | 370/338 |
| 7,953,101 | B2* | 5/2011 | Loprieno et al. .......... | 370/401 |
| 2002/0057713 | A1 | 5/2002 | Bagchi et al. | |
| 2002/0131414 | A1* | 9/2002 | Hadzic ...................... | 370/393 |
| 2003/0112833 | A1 | 6/2003 | Kamiya | |
| 2004/0252720 | A1 | 12/2004 | Xiong et al. | |
| 2005/0286521 | A1 | 12/2005 | Chiang et al. | |
| 2007/0008991 | A1 | 1/2007 | Sridharan et al. | |
| 2007/0116046 | A1* | 5/2007 | Liu et al. .................. | 370/466 |
| 2008/0124079 | A1 | 5/2008 | Zou | |
| 2008/0219157 | A1* | 9/2008 | Lakshminaraya et al. ... | 370/229 |
| 2008/0219669 | A1* | 9/2008 | Fourcand .................. | 398/98 |
| 2009/0046593 | A1 | 2/2009 | Ptasinski et al. | |
| 2009/0148161 | A1* | 6/2009 | Walker et al. ............. | 398/43 |
| 2009/0154475 | A1 | 6/2009 | Lautenschlaeger | |

FOREIGN PATENT DOCUMENTS

WO  2003/092207 A1  11/2003

OTHER PUBLICATIONS

International Search Report and Written Opinion received for International Patent Application Serial No. PCT/US2010/060281, mailed on Mar. 29, 2011, 11 pages.
Wikipedia, "Synchronous Optical Networking", (Jul. 10, 2009), 11 pages.
Wikipedia, "Gigabit Ethernet", (Jul. 25, 2009), 6 pages.
Wikipedia, "Forward Error Correction", (Jun. 26, 2009), 4 pages.
Wikipedia, "Generic Framing Procedure", (Jun. 14, 2008), 2 pages.
Wikipedia, "Take the Lead in Next Generation SONET/SDH & RPR with OmniBER", 1 page.

* cited by examiner

*Primary Examiner* — Min Jung

(57) ABSTRACT

According to another general aspect, an apparatus may include a receiver, a decoding engine, an envelope generator, an error code generator, and a transmitter. In one embodiment, the receiver may be configured to receive an Ethernet packet that includes a payload portion. In various embodiments, the decoding engine may be configured to decode at least the payload portion of the Ethernet packet such that the size of the payload portion is reduced. In some embodiments, the envelope generator may be configured to encapsulate the payload portion such that packet boundaries may be identified. In various embodiments, the error code generator may be configured to associate an error correction code with the encapsulated payload portion. In another embodiment, the transmitter may be configured to transmit the encapsulated payload and error correction code.

22 Claims, 6 Drawing Sheets

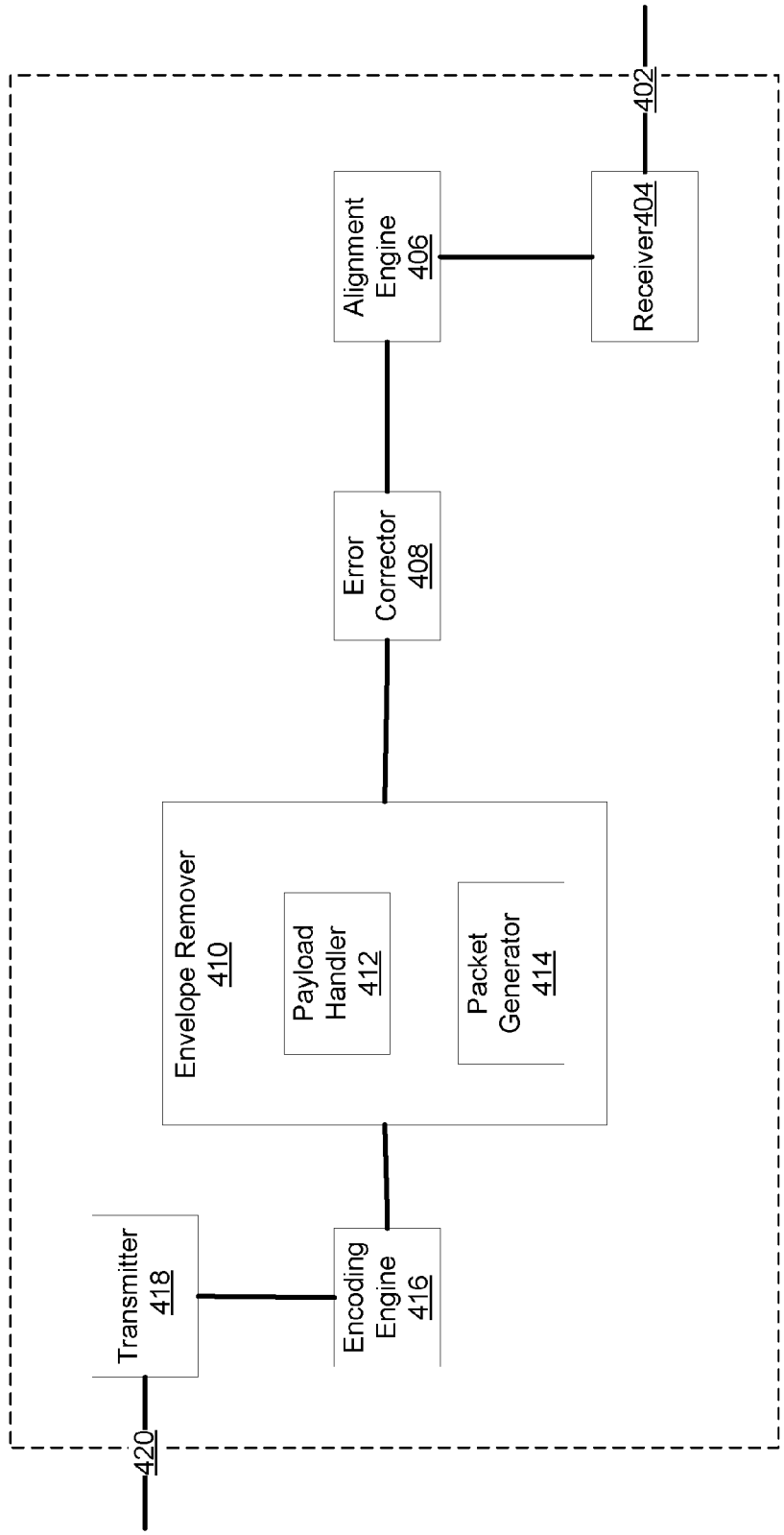

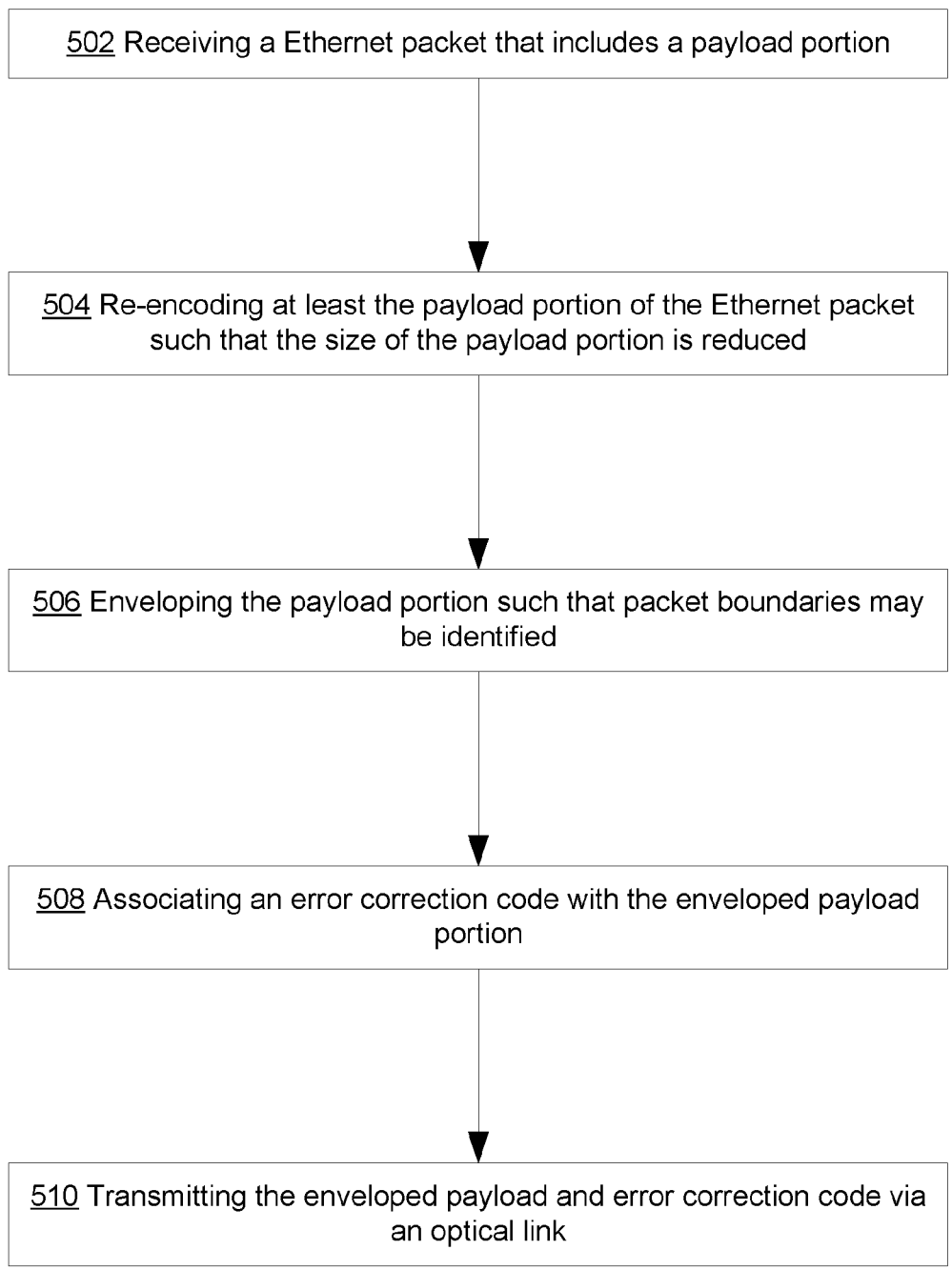

FIG. 6
600

602 Receiving a transmission frame including at least one encapsulated portion of an Ethernet packet encoded such that one symbol or less is used per bit of information, and an error correction code

604 Identifying the boundaries of the encapsulated portion of the Ethernet packet(s)

606 Applying the error correction code to the encapsulated portion of the Ethernet packet(s) in order to correct transmission errors

608 Recreating at least one Ethernet packet utilizing the encapsulated portion of the Ethernet packet(s)

610 Re-encoding the recreated Ethernet packet(s) such that the recreated Ethernet packet is substantially direct current balanced

612 Transmitting the re-encoded Ethernet packet(s)

TECHNIQUES FOR ETHERNET OPTICAL REACH IMPROVEMENT

TECHNICAL FIELD

The present disclosure generally relates to the communication of information, and also to the converting information between one medium or standard to another.

BACKGROUND

Ethernet is a widely field deployed protocol and often used for a very large variety of applications. Gigabit Ethernet (GbE or 1 GigE) in recent years has become widely deployed and generally allows data speeds of approximately 1 Gb/sec, with an actual line rate of approximately 1.25 Gb/sec of 8B/10B encoded data. It is expected that speed increases will occur as time goes by (such as 10GE, 100GE).

Often the usable distance of such high speed Ethernet networks is limited by optical or electrical signal degradation. In the optical case, such signal degradation often requires signal regeneration or the use of more sophisticated and expensive optical interfaces that are able to tolerate transmission impairments.

Various solutions to this issue have been attempted in the relatively cheap electrical domain. History has already proven that electronic domain processing can typically deliver better performances at lower price when compared to optical domain techniques.

One such example is Forward Error Correction (FEC). In telecommunication and information theory, FEC is generally a system of error control for data transmission, whereby the sender adds redundant data to its messages, also known as an error-correction code. This allows the receiver to detect and correct errors (within some bound) without the need to ask the sender for additional data.

BRIEF DESCRIPTION OF THE DRAWINGS

FIG. 4 is a block diagram of an example embodiment of a system or apparatus in accordance with the disclosed subject matter.

FIG. 5 is a flow chart of an example embodiment of a technique in accordance with the disclosed subject matter.

FIG. 6 is a flow chart of an example embodiment of a technique in accordance with the disclosed subject matter.

Like reference symbols in the various drawings indicate like elements.

DESCRIPTION OF EXAMPLE EMBODIMENTS

Overview

According to an example embodiment, an apparatus may include a receiver configured to receive an Ethernet packet that includes a payload portion; a decoding engine configured to decode at least the payload portion of the Ethernet packet such that the size of the payload portion is reduced; an envelope generator configured to encapsulate the payload portion such that packet boundaries may be identified; an error code generator configured to associate an error correction code with the encapsulated payload portion; and a transmitter configured to transmit the encapsulated payload and error correction code.

According to another example embodiment, a method may include receiving, from another networking apparatus, an Ethernet packet that includes a payload portion; re-encoding at least the payload portion of the Ethernet packet such that the size of the payload portion is reduced; encapsulating the payload portion such that packet boundaries may be identified; associating an error correction code with the encapsulated payload portion; and transmitting the encapsulated payload and error correction code via an optical link.

According to another example embodiment, a method of using a networking apparatus may include receiving, from another networking apparatus, a transmission frame including at least one encapsulated portion of an Ethernet packet encoded such that one symbol or less is used per bit of information, and an error correction code; identifying the boundaries of the encapsulated portion of the Ethernet packet(s); applying the error correction code to the encapsulated portion of the Ethernet packet(s) in order to correct transmission errors, if any; and recreating at least one Ethernet packet utilizing the encapsulated portion of the Ethernet packet(s).

According to another example embodiment, an apparatus may include means for receiving an Ethernet packet that includes a payload portion; means for decoding at least the payload portion of the Ethernet packet such that the size of the payload portion is reduced; means for encapsulating the payload portion such that packet boundaries may be identified; means for associating an error correction code with the encapsulated payload portion; and means for transmitting the encapsulated payload and error correction code.

The details of one or more implementations are set forth in the accompanying drawings and the description below. Other features will be apparent from the description and drawings, and from the claims.

A system and/or method for communicating information, substantially as shown in and/or described in connection with at least one of the figures, as set forth more completely in the claims.

DESCRIPTION

Figure 1:
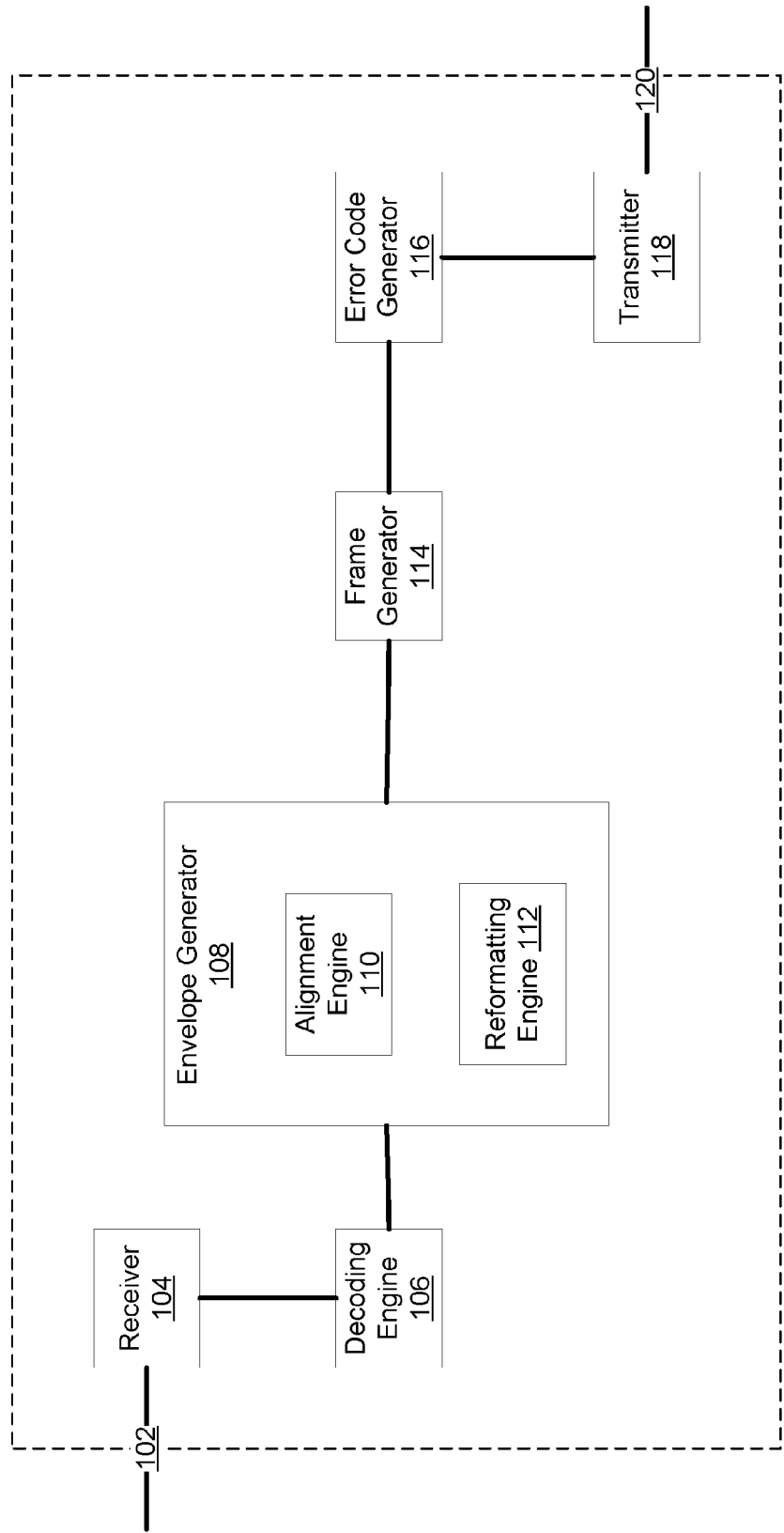
FIG. 1 is a block diagram of an example embodiment of a system or apparatus in accordance with the disclosed subject matter.

FIG. 1 is a block diagram of an example embodiment of a system or apparatus 100 in accordance with the disclosed subject matter. In various embodiments, the apparatus 100 may include one or more of the following: a receiver 104, a decoding engine 106, an envelope generator 108, a frame generator 114, an error code generator 116, and a transmitter 118.

In various embodiments, the apparatus 100 may receive an input signal 102 and transform or reformat that signal into the output signal 120. In some embodiments, the apparatus 100 may add a form of error correction (e.g., FEC, etc.) to the input signal 102 or its derivative, such that the output signal 120 includes a level of data redundancy. In various embodiments, the apparatus 100 may substantially transmit the output signal 120 at a rate equal to or greater than the line rate of the received input signal 102. In various embodiments, this may mean that an input signal 102 may be received at a rate of 1 Gb/sec and the output signal 120 may be transmitted at a line rate of 1 Gb/sec or higher.

In some embodiments, the input signal 102 may include a GbE signal operating at a line rate of approximately 1 Gb/sec (it is understood that operational line rates typically include speed variances within industry standards and tolerances). In another embodiment, the input signal 102 may include information transmitted via another protocol (e.g., a higher frequency of Ethernet, etc.). Hereafter, the input signal 102 will be illustrated and described as an Ethernet signal but it is understood that the above is merely one illustrative example to which the disclosed subject matter is not limited.

In some embodiments, this input signal 102 may be received in the electrical or optical domain. In various embodiments, if the input signal 102 includes an optical signal, it may be converted into the electrical domain or an electrical signal by the receiver 104. Hereafter, the input signal 102 will be illustrated and described as an electrical signal but it is understood that the above is merely one illustrative example to which the disclosed subject matter is not limited.

In various embodiments, the decoding engine 106 may decode or re-encode the received input signal 102. In various embodiments, the decoding engine 106 may be configured to decode or re-encode the received input signal 102 such that the re-encoded input signal is reduced in size or reduced in bit rate or bits per second. For example, in one embodiment, if the 8B/10B code for every 10 bit of data received via the input signal 102 is removed, 8 bits may be forwarded to the downstream blocks. In various embodiments, this may include decoding or re-encoding only a portion of the received input signal 102, for example, only the payload portion of the received input signal 102, etc.

In one embodiment, the input signal 102 may be encoded using the 10B encoding standard in which each 1 byte of information is encoded to use 10 bits in order to generally balance 0s and 1s (e.g., DC-balance) and reduce, among other things, inter-symbol interference. In various embodiments, the decoding engine 106 may be configured to decode or re-encode the 10B encoded received input signal 102 to an 8B format. As the 8B encoding formatting uses 8-bits to represent 1 byte, the re-encoded input signal (or portion thereof) may reduce the size of the received input signal 102 by approximately 20%. It is understood that the above is merely an illustrative example to which the disclosed subject matter is not limited.

In various embodiments, the re-encoded input signal or at least a portion thereof may be processed by the envelope generator 108. In various embodiments, the envelope engine 108 may be configured to wrap or reformat the re-encoded signal into another protocol or format. In such an embodiment, the envelope generator 108 may be configured to generate a message envelope around the re-encoded signal or a portion thereof (e.g., the user data or payload portion, etc.).

In one embodiment, the envelope generator 108 may re-format, encapsulate, or envelop a portion of the re-encoded input signal into a message, packet or frame, substantially compliant with the Generic Framing Procedure (GFP) format or, more specifically, the GFP-Framed (GFP-F) format or a client data frame thereof. Encapsulation may generally involve providing the information or a portion thereof of the received signal 102 as a payload of a packet of a second protocol (e.g., GFP, etc.), and then adding a header and/or trailer to generate the packet or packets of the second protocol. In various embodiments, the second protocol and subsequent packet or frame may be referred to as an envelope, analogously to the way a paper envelope is used to encapsulate a paper letter.

Figure 2:
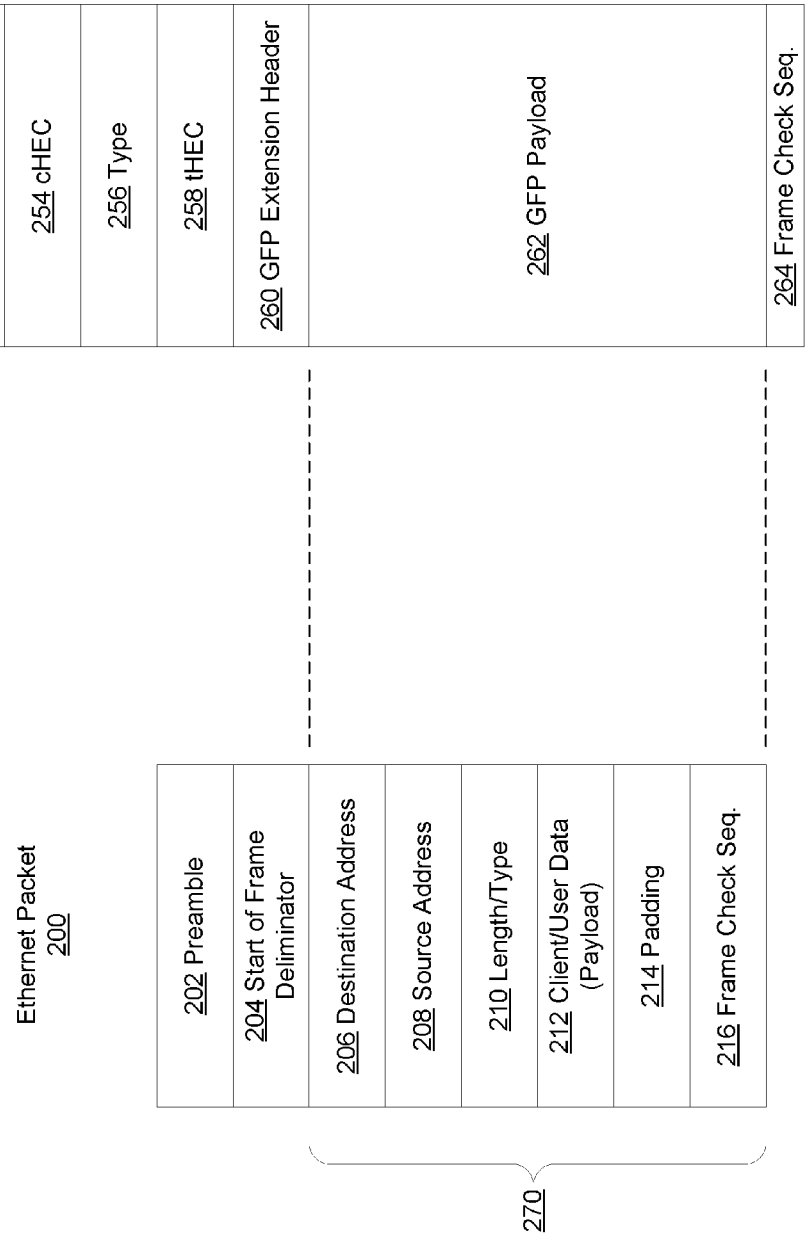
FIG. 2 is a block diagram of an example embodiment of data in accordance with the disclosed subject matter.

FIG. 2 is a block diagram of an example embodiment of data in accordance with the disclosed subject matter. In the illustrated embodiment, an Ethernet packet 200 or a portion 270 thereof may be reformatted or encapsulated or enveloped into a GFP Frame 201. It is understood that the above are merely a few illustrative examples to which the disclosed subject matter is not limited. Also, it is understood that the diagrams represent no uniform scale and are merely informational.

In one embodiment, a generic Ethernet packet 200 may include a plurality of fields or portions. For example, the Ethernet packet 200 may include a preamble 202, a start of frame delimiter 204, a destination address field 206, a source address field 208, a length and type field or fields 210, a client or user data portion 212 (which is also referred to as the payload 212), any padding 214 and often a frame check sequence portion 216 (which is a form of error correction).

Likewise, in various embodiments, the GFP Frame 201 may include a Payload Length Indicator (PLI) portion 252, a core header error control (cHEC) field 254, a payload or type identifier 256, a type HEC (tHEC) field 258, a GFP extension header portion 260 and a GFP payload portion 262. In various embodiments, the GFP Frame 201 may also include a payload frame check sequence (FCS) 264.

In various embodiments, the envelope generator 108 of FIG. 1 may be configured to generate the GFP Frame 201 and copy or add the Ethernet portion 270 (including, in one embodiment, the destination address 206, source address 208, length/type fields 210, payload portion 212, any padding 214, and the FCS 216) as the GFP Payload portion 262. Therefore, in this manner, the envelope generator 108 may envelope or encapsulate the Ethernet packet 200 or Ethernet portion 270 into a GFP frame 201, e.g., by providing the Ethernet frame 200 or Ethernet portion 270 in a GFP payload 262, adding a GFP frame header including, e.g., fields 252, 254, 256, 258 and 260, and by adding a GFP frame trailer such as frame check sequence (FCS) 264. Although, it is understood that the above is merely one illustrative example to which the disclosed subject matter is not limited.

In various embodiments, by adding one Ethernet packet 200 or portion 270 to a single GFP Frame 201, the envelope generator 108 of FIG. 1 may be configured to encapsulate the Ethernet packet in such a way that the packet boundaries (e.g., destination address 206 and the FCS 216) may be identified by a receiving apparatus or entity. For example, upon receipt of the GFP Frame 201 by a receiving apparatus (e.g., apparatus 400 of FIG. 4) the receiving apparatus may make use of or employ the PLI field 252 to determine the size of the GFP payload 262 and therefore the size of the encapsulated Ethernet portion 270.

Returning to FIG. 1, which is a block diagram of an example embodiment of a system or apparatus 100 in accordance with the disclosed subject matter, the envelope generator 108 may include an alignment engine 110 and a reformatting engine 112.

In various embodiments, the alignment engine 110 may be configured to align the re-encoded input signal or, in one embodiment, the re-encoded Ethernet packet. In one embodiment, the alignment may maintain octet-alignment within the packet and bit-identification may be maintained. In one such embodiment, on an octet-by-octet basis bits 0-7 of the Ethernet packet may correspond with bits 8-1 of the GFP Frame, as described above; although, it is understood that the above is merely one illustrative example to which the disclosed subject matter is not limited. In such an embodiment, the alignment may facilitate the use of performance monitoring.

In addition, in one embodiment, the alignment engine 110 may be configured to encapsulate one or more of the re-encoded input signal's control signals to an envelope format. For example, in one specific embodiment, for an input Ethernet signal, the alignment engine 110 may encapsulate the preamble and/or Inter-Packet Gaps (IPGs) to facilitate packet delineation at the receiving apparatus.

For example, in one embodiment, the alignment engine 110 or the apparatus 100, more generally, may be configured to follow the following rule set when deleting or restoring Ethernet IPGs; although, it is understood that the below is merely one illustrative example to which the disclosed subject matter is not limited. In various embodiments, the IPGs may be deleted before the Ethernet Medium Access Control (MAC) frame is processed by the GFP source adaptation process (e.g., the transmitting apparatus 100) and restored after the GFP frame is processed by the GFP sink adaptation process (e.g., the receiving apparatus). IPGs may be deleted as the Ethernet MAC frame is extracted from the client bitstream or input signal 102. The extracted Ethernet MAC frame may then be forwarded to the GFP source adaptation process or reformatting engine 112 for subsequent encapsulation into a GFP frame. IPGs may be restored after the Ethernet MAC frame is extracted from the GFP frame by the GFP termination element (e.g., the receiving apparatus). IPGs may be restored by ensuring that sufficient octets containing an idle pattern of 07 hex are present between consecutive received Ethernet MAC frames to meet the minimum receiver Inter-Frame Gap (IFG) requirements as stated by the respective communication. The extracted (uncoded) Ethernet MAC frame may then forwarded to the client layer for subsequent processing. Minimum receiver IFG requirements are stated in IEEE 802.3, section 4.4, which may be employed in one embodiment. *IEEE Standard for Information technology—Telecommunications and information exchange between systems—Local and metropolitan area networks—Specific requirements Part* 3: *Carrier Sense Multiple Access with Collision Detection* (*CSMA/CD*) *Access Method and Physical Layer Specifications*, IEEE Std 802.3-2008.

In various embodiments, the reformatting engine 112 may be configured to map or copy a portion or the whole of the re-encoded input signal into the new communication protocol or format. One embodiment of this is described above in relation to FIG. 2.

In some embodiments, the reformatting engine 112 or more generally the envelope generator 108 may be configured to add or generate Idle or NOOP (no operation) frames or portions as needed or desirable in order to properly align the input packets or data portions and fill the message envelope payload. In one embodiment, a GFP Idle packet may be generated; although, it is understood that the above is merely one illustrative example to which the disclosed subject matter is not limited.

In various embodiments, a GFP Idle frame may be a 4-octet GFP control frame that does not include a GFP payload portion. In some embodiments, the Idle frame may be used or employed as a filler frame for the GFP source adaptation process to facilitate the adaptation of the GFP octet stream to any given transport medium where the transport medium channel has a higher capacity than required by the client signal.

In one embodiment, the apparatus 100 may include a frame generator 114. In various embodiments, the frame generator 114 may be configured to generate a transmission frame. In various embodiments, this may include grouping a plurality of message envelope frames (e.g., GFP frames, etc.) into a transport protocol or network (e.g., a time division multiplexed (TDM) frame, a synchronous optical network (SONET) frame, etc.). In various embodiments, this may include the generation of Idle or NOOP frames, as described above. In some embodiments, the frame generator 114 may generate such frames or request that the envelope generator 108 generate such frames; although, it is understood that the above are merely a few illustrative examples to which the disclosed subject matter is not limited.

In one embodiment, the apparatus 100 may include an error code generator 116. In various embodiments, the error code generator 116 may be configured to generate an error correction code. In some embodiments, the error code generator 116 may add, append, or pre-pend the error correction code to the encapsulated payload or signal, or alternately, to the transmission frame generated by the frame generator 114. In another embodiment (not illustrated), the frame generator 114 may perform the actual combining of the transmission frame and the error correction code. It is understood that the above are merely a few illustrative examples to which the disclosed subject matter is not limited.

In one embodiment, the error code generator 116 may be configured to generate a forward error correction (FEC) code, as described above. As described above, FEC may include a system of error control for data transmission, whereby the sender adds redundant data to its messages, also known as an error-correction code. FEC may, in some embodiments, allow the receiver to detect and correct errors (within some bound) without the need to ask the sender for additional data.

In one embodiment, the size of the FEC may be less than or equal to the amount of bits or space than the reduction in size of the received input signal 102 or payload portion thereof caused by the decoding engine 106. For example, if the received input signal 102 was reduced in size by 20%, the FEC may include a number of bits equal to 20% of the received input signal. In such an embodiment, the output signal 120 may be transmitted at the same line rate as the input signal 102.

However, in many embodiments, the additional overhead incurred by the message envelope (e.g., GFP frame envelope, etc.), any added Idle frames (e.g., GFP Idle frames), etc. may decrease the available amount of bits saved by the re-encoding process. For example, in one embodiment, the FEC portion of the transmission frame may be set to substantially 7% of the size of the transmission frame. In various industries, 7% (or another value) may be regarded as an acceptable amount of data redundancy; although, it is understood that the above is merely one illustrative example to which the disclosed subject matter is not limited.

For example, in one embodiment, the input signal 102 may be received from the client equipment. In such an embodiment, the input signal 102 may include a GE signal (as an example) which is 8B/10B encoded and thus the effective bit rate may be 1.25 Gbit/s. In the apparatus 100 the 8B/10B coding may be stripped from the input signal 102 (lowering the effective bit rate down to 1 Gbit/s). In some embodiments, the Inter-Packet Gaps, etc. may also be removed (lowering the effective bit rate a little bit again). In various embodiments, GFP-F framing and encapsulation may occur and a FEC added, as described above. In such an embodiment, the bit rate may become ~1.07 Gbit/s. In another embodiment, the apparatus 100 may add GFP Idle frames, as described above, to obtain a bit rate of 1.25 Gbit/s. Conversely, on the far end or receiving side, which receives the transmitted signal 120, a similar apparatus (e.g., apparatus 400 of FIG. 4) may extract or de-encapsulate via an inverse process to that described above and further described in reference to FIG. 4, bringing the bit rate up to 1.25 Gbit/s prior to providing the signal to the end user.

In such an embodiment, the effective bandwidth, from an end user perspective, that is to say the amount of data the endpoints exchange (e.g., input signal 102 and output signal 420) may be substantially constant. In such an embodiment, the apparatuses 100 and 400 may add FEC bits (7% or more) leveraging the saving created by stripping 8B/10B code off (e.g., a 1.25 Gbit/s-1.00 Gbit/s difference). In various embodiments, the apparatus may be configured to select or preconfigured to employ one of two options. In one embodiment, the apparatus 100 may keep the bit rate at a minimum level (e.g., 1.00 Gbit/s+FEC or 1.07 Gbit/s). In another embodiment, the apparatus 100 may add GFP Idles until the effective bit rate is essentially the same as the input signal 102 (e.g., 1.00 Gbit/s+GFP Idle(s)+FEC=1.25 Gbit/s).

In various embodiments, the apparatus 100 may include a transmitter 118. In one embodiment, the transmitter 118 may be configured to transmit the transmission packet (which includes at least the error correction code and the payload portion of the input signal 102) as output signal 120. As described above, in various embodiments, the output signal 102 may be electrical or optical. While the output signal 120 is generally referred to as optical herein, it is understood that this is merely one illustrative example to which the disclosed subject matter is not limited.

Figure 3:
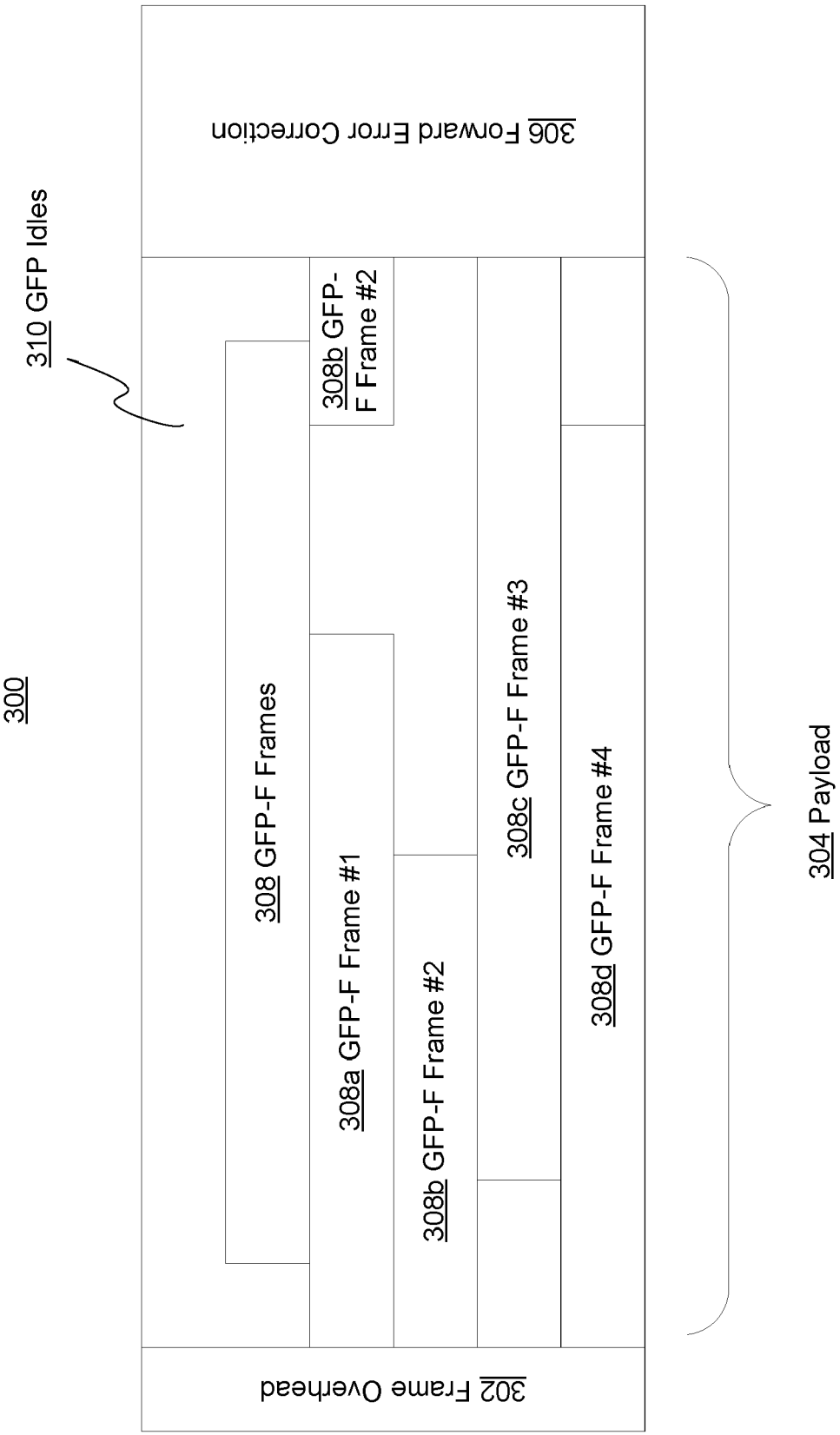
FIG. 3 is a block diagram of an example embodiment of data in accordance with the disclosed subject matter.

FIG. 3 is a block diagram of an example embodiment of data or transmission frame 300 in accordance with the disclosed subject matter. In one embodiment, the transmission frame 300 may be generated or assembled by a frame generator 114 of FIG. 1 and transmitted by transmitter 118 of FIG. 1, as described above.

In one embodiment, the transmission frame 300 may include a frame overhead portion 302 (e.g., header information, etc.), a payload portion 304, and an error correction code 306. In the illustrated embodiment, the error correction code 306 may include a forward error correction code 306; although, it is understood that the above is merely one illustrative example to which the disclosed subject matter is not limited.

In various embodiments, the payload portion 304 may include one or more encapsulated frames or encapsulated portions of the input signal (e.g., the received Ethernet signal, etc.). In the illustrated embodiment, the encapsulated frames may include a GFP-F frame 308. In the illustrated embodiment, five GFP-F frames 308 are illustrated (GFP-F frames 308, 308a, 308b, 308c, and 308d). In various embodiments, the portion of the payload 304 not occupied by the encapsulated frames 308 may be occupied by a number of Idle or NOOP frames (e.g., GFP Idle frames 310). It is understood that the above are merely a few illustrative examples to which the disclosed subject matter is not limited.

In order to expand upon the concept of encapsulating and transmitting a high speed input signal (e.g., GbE signal) with a level of data redundancy or error correction at the input signal's line rate, the following data rate calculations are provided as an example. It is understood that the below are merely one illustrative example to which the disclosed subject matter is not limited.

In one embodiment, the apparatus (e.g., apparatus 100 of FIG. 1) may receive a GbE packet including user data or information with a nominal data rate of 1.25 Gb/sec. Upon decoding or re-encoding from 10B encoding to 8B encoding, the data rate of the information may be decreased from 1.25 Gb/sec to ~1.07 Gb/sec. In such an embodiment, the amount of information may remain constant, but the bit rate changes depending on the presence of the 8B/10B code.

In various embodiments, as the information is encapsulated within a GFP frame 8 bytes of the Ethernet packet (the GbE preamble and frame delimiter) may be removed, and 4 bytes may be added (GPF length and CRC fields).

As the information is packed, assembled, or grouped into the transmission frame (e.g., a TDM packet, etc.) additional efficiencies may be lost. For example, in one embodiment, the transmission frame may include 1 byte of overhead, 238 payload bytes, and 16 FEC bytes, if the FEC is set to ~7% of the size of the payload portion.

In such an embodiment, the worst case frequency or data rate of the information originally received via GbE at a data rate of 1.25 Gb/sec may be 1.07 Gb/sec. Therefore, the information may be transmitted by the apparatus at a line rate or data rate equal to or less than the line-rate or data rate of the received input signal. Although, it is understood that the above is merely an illustrative example to which the disclosed subject matter is not limited.

FIG. 4 is a block diagram of an example embodiment of a system or apparatus 400 in accordance with the disclosed subject matter. In one embodiment, the apparatus 400 may include one or more of the following: a receiver 404, an alignment engine 406, an error corrector 408, an envelope remover 410, an encoding engine 416, and a transmitter 418.

In one embodiment, the apparatus 400 may receive an input signal 402 and transform that input signal 402 into the output signal 420. In various embodiments, the input signal 402 may include a transmission frame whose information or user data is converted into another communication protocol and re-transmitted as output signal 420. In various embodiments, the operation of the apparatus 400 may essentially be in inverse of the apparatus 100 of FIG. 1.

In one embodiment, the receiver 404 may receive the input signal 402. In various embodiments, the input signal 402 may be an optical signal or, in another embodiment, an electrical signal. In keeping with the above illustrative example, input signal 402 will be described as being an optical signal; however, it is understood that the above is merely one illustrative example to which the disclosed subject matter is not limited. In one embodiment, the input signal 402 may include a transmission frame as described by FIG. 3.

In various embodiments, the received input signal 402 may be aligned by the alignment engine 406. In various embodiments, the alignment engine 406 may be configured to recognize the beginning and end of any transmission frames of message envelopes (e.g., GFP frames) included within the received input signal 402.

In some embodiments, the Error corrector 408 may be configured to test the validity of the received input signal by employing the error correction code include by the input signal 402. In various embodiments, this error correction code may include a FEC code, as described above. In some embodiments, the error corrector may be configured to correct one or more errors included within the received input signal using the error correction code portion.

In various embodiments, the envelope remover 410 may be configured to remove the message envelope applied to the payload portion or other portions of the user data. In one embodiment, the envelope remover 410 may be configured to remove the GFP frame from the Ethernet payload or other portions that are encapsulated within. In various embodiments, the envelope remover 410 may also be configured to break the transmission frame into separate message envelopes (e.g., GFP frame, etc.). In one such embodiment, in this block, the envelope remover 410 may be configured to remove the GFP frames from the FEC frame, remove the GFP header, and add back a preamble and IPG prior to transmission.

In one embodiment, the payload handler 412 may be configured to remove or extract the encapsulated payload from the GFP payload portion. In various embodiments, the packet generator 414 may be configured to generate the appropriate packet in the output format or protocol (e.g., GbE, etc.) and include the payload extracted by the payload handler 412. In various embodiments, the packet generator 414 or envelope remover 410 may be configured to generate any IPGs, as described above.

In various embodiments, the encoding engine 416 may be configured to encode or re-code the reconstructed packets. For example, in one embodiment, the reconstructed packets may be re-encoded from 8B encoding to 10B encoding, the reverse of that described above.

In some embodiments, the transmitter 418 may be configured to transmit the re-encoded packets to another apparatus or networking device. As described above, in various embodiments, the output signal 420 may include an optical signal or, in another embodiment, an electrical signal. In the illustrated embodiment, the transmitter 418 may be configured to transmit an electrical GbE signal; although, it is understood that the above is merely one illustrative example to which the disclosed subject matter is not limited.

It is understood that, in various embodiments, the transmitting apparatus (e.g., apparatus 100 of FIG. 1) and the receiving apparatus (e.g., apparatus 400 of FIG. 4) may be integrated or co-exist within a more unified apparatus. In some embodiments, the transmitting and receiving apparatuses may share various components (e.g., an integrated decoding and encoding engine, etc.). It is understood that the above are merely a few illustrative examples to which the disclosed subject matter is not limited.

FIG. 5 is a flow chart of an example embodiment of a technique 500 in accordance with the disclosed subject matter. In various embodiments, the technique 500 may be used or produced by the systems such as those of FIG. 1 or 4. Furthermore, portions of technique 500 may be use or produce the data elements illustrated by FIGS. 2 and/or 3. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, an Ethernet packet that includes a payload portion may be received. In various embodiments, this packet may have been transmitted from another networking apparatus, as described above. In various embodiments, one or more of the action(s) illustrated by this Block may be performed by the apparatus or system of FIG. 1, the receiver 104 of FIG. 1, as described above.

Block 504 illustrates that, in one embodiment, at least the payload portion of the Ethernet packet may be re-encoded such that the size of the payload portion is reduced, as described above. In one embodiment, the entire Ethernet packet may be re-encoded, as described above. In another embodiment, a portion including more than the payload portion (e.g., the portion 270 of FIG. 2) may be re-encoded, as described above.

In one embodiment, re-encoding may include performing an 8B/10B decoding of the received Ethernet payload portion or the re-encoded portion of the Ethernet packet, as described above. In some embodiments, the re-encoding may include reducing the size of the payload portion by between 0 and 20 percent, inclusive, as described above. In various embodiments, one or more of the action(s) illustrated by this Block may be performed by the apparatus or system of FIG. 1, the decoding engine 106 of FIG. 1, as described above.

Block 506 illustrates that, in one embodiment, the payload portion may be encapsulated such that packet boundaries may be identified, as described above. In one embodiment, the encapsulating may include more than just the payload portion, as described above. In some embodiments, encapsulating may include encapsulating a portion of the Ethernet packet into a payload portion of a GFP frame, as described above. In various embodiments, encapsulating may include placing the portions of the Ethernet packet from the destination address portion to the frame check sequence, inclusive, into the payload portion of the GFP frame, as described above. In various embodiments, one or more of the action(s) illustrated by this Block may be performed by the apparatus or system of FIG. 1, the encapsulating generator 108 of FIG. 1, as described above.

Block 508 illustrates that, in one embodiment, an error correction code may be associated with the encapsulated payload portion, as described above. In one embodiment, associating may include grouping a plurality of GFP payloads and zero or more GFP Idle frames into a transmission frame, and adding a Forward Error Correction (FEC) portion to the transmission frame, as described above. In various embodiments, associating may include associating an error correction code includes adding an error correction code that includes as much or less space than the reduction in size of the payload portion, as described above. In such an embodiment, an FEC portion may include approximately 7% or another predetermined value of the total size of the transmission frame, as described above. In various embodiments, one or more of the action(s) illustrated by this Block may be performed by the apparatus or system of FIG. 1, the frame generator 114 or the error code generator 116 of FIG. 1, as described above.

Block 510 illustrates that, in one embodiment, the encapsulated payload and error correction code may be transmitted via an optical link, as described above. In various embodiments, the encapsulated payload and error correction code may be included as part of a transmission frame, as described above. In some embodiments, transmitting may include substantially transmitting the encapsulated payload portion at a rate equal to or greater than the line rate or data rate of the received Ethernet packet, as described above. In various embodiments, one or more of the action(s) illustrated by this Block may be performed by the apparatus or system of FIG. 1, the transmitter 118 of FIG. 1, as described above.

FIG. 6 is a flow chart of an example embodiment of a technique 600 in accordance with the disclosed subject matter. In various embodiments, the technique 600 may be used or produced by the systems such as those of FIG. 1 or 4. Furthermore, portions of technique 600 may be use or produce the data elements illustrated by FIGS. 2 and/or 3. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, a transmission frame may be received, as described above. In various embodiments, the transmission frame may include at least one encapsulated portion of an Ethernet packet encoded such that one symbol or less is used per bit of information, and an error correction code, as described above. In various embodiments, the encapsulated portion of the Ethernet packet may have been previously decoded using or employing an 8B/10B scheme, as described above. In one embodiment, the transmission frame may be received via an optical or electrical network and previously transmitted by another networking apparatus, as described above. In some embodiments, receiving may include receiving at least one encapsulated portion of an Ethernet packet encapsulated in a Generic Frame Protocol (GFP) Frame, and encoded in an 8-bit code, as described above. In various embodiments, one or more of the action(s)

illustrated by this Block may be performed by the apparatus or system of FIG. 4, the receiver 404 of FIG. 4, as described above.

Block 604 illustrates that, in one embodiment, the boundaries of the encapsulated portion of the Ethernet packet(s) may be identified, as described above. In one embodiment, identifying may include recognizing packet boundaries, as described above. In various embodiments, one or more of the action(s) illustrated by this Block may be performed by the apparatus or system of FIG. 4, the alignment engine 406 of FIG. 4, as described above.

Block 606 illustrates that, in one embodiment, the error correction code may be applied to the encapsulated portion of the Ethernet packet(s) in order to correct transmission errors, if any, as described above. In various embodiments, the error correction code may include a forward error correction code, as described above. In various embodiments, applying may include applying the error correction code to the transmission frame, as described above. In another embodiment, applying may include applying the error correction code to the encapsulated Ethernet portions, as described above. In various embodiments, one or more of the action(s) illustrated by this Block may be performed by the apparatus or system of FIG. 4, the error corrector 408 of FIG. 4, as described above.

Block 608 illustrates that, in one embodiment, at least one Ethernet packet may be recreated or generated utilizing the encapsulated portion of the Ethernet packet(s), as described above. In one embodiment, this may include generating Ethernet preamble portions, as described above. In another embodiment, recreating may include generating inter-packet gaps (IPGs), as described above. In various embodiments, one or more of the action(s) illustrated by this Block may be performed by the apparatus or system of FIG. 4, the envelope remover 610 of FIG. 4, as described above.

Block 610 illustrates that, in one embodiment, the recreated Ethernet packet(s) may be re-encoded such that the recreated Ethernet packet is substantially direct current balanced, as described above. In one embodiment, this may include encoding the recreated Ethernet packet(s) using an 8B/10B encoding scheme, as described above. In various embodiments, one or more of the action(s) illustrated by this Block may be performed by the apparatus or system of FIG. 4, the encoding engine 416 of FIG. 4, as described above.

Block 612 illustrates that, in one embodiment, the re-encoded Ethernet packets may be transmitted to another networking apparatus or portion of the apparatus or system performing the technique 600, as described above. In various embodiments, one or more of the action(s) illustrated by this Block may be performed by the apparatus or system of FIG. 4, the transmitter 418 of FIG. 4, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
a receiver configured to receive an Ethernet packet that includes a payload portion;
a decoding engine configured to decode at least the payload portion of the Ethernet packet such that the size of the payload portion is reduced;

an envelope generator configured to encapsulate the payload portion such that packet boundaries may be identified;

an error code generator configured to associate an error correction code with the encapsulated payload portion; and a transmitter configured to transmit the encapsulated payload and error correction code.

2. The apparatus of claim 1, wherein the decoding engine is configured to perform an 8B/10B decoding of the received Ethernet payload portion.

3. The apparatus of claim 1, wherein the decoding engine is configured to reduce the size of the payload portion by between 0 and 20 percent, inclusive.

4. The apparatus of claim 1, wherein error code generator is configured to generate an error correction code that includes as much or less space than the reduction in size of the payload portion.

5. The apparatus of claim 1, wherein the envelope generator is configured to encapsulate a portion of the Ethernet packet into a payload portion of a Generic Frame Protocol (GFP) frame.

6. The apparatus of claim 1, further including a frame generator configured to generate a transmission frame; and
wherein the transmission frame includes:
a plurality of Generic Frame Protocol (GFP) payloads and zero or more GFP Idle frames, and
a Forward Error Correction portion.

7. The apparatus of claim 1, wherein the transmitter is configured to transmit the encapsulated payload portion at a data rate substantially equal to or less than the data rate of the received Ethernet packet.

8. The apparatus of claim 1, further including:
a transmission frame receiver configured to receive, from another apparatus, a transmission frame including at least one encapsulated portion of an Ethernet packet encoded such that one symbol or less is used per bit of information, and an error correction code;
an alignment engine configured to identify the boundaries of the encapsulated portion of the Ethernet packet(s);
an error corrector configured to apply the error correction code to the encapsulated portion of the Ethernet packet(s) in order to correct transmission errors, if any; and
a envelope remover configured to recreate at least one Ethernet packet utilizing the encapsulated portion of the Ethernet packet(s).

9. A method of using a networking apparatus comprising:
receiving, from another networking apparatus, an Ethernet packet that includes a payload portion;
re-encoding at least the payload portion of the Ethernet packet such that the size of the payload portion is reduced;
encapsulating the payload portion such that packet boundaries may be identified;
associating an error correction code with the encapsulated payload portion; and
transmitting the encapsulated payload and error correction code via an optical link.

10. The method of claim 9, wherein re-encoding includes performing an 8B/10B decoding of the received Ethernet payload portion.

11. The method of claim 9, wherein re-encoding includes reducing the size of the payload portion by between 0 and 20 percent, inclusive.

12. The method of claim 9, wherein associating an error correction code includes generating an error correction code that includes as much or less space than the reduction in size of the payload portion.

13. The method of claim 9, wherein encapsulating includes encapsulating a portion of the Ethernet packet into a payload portion of a Generic Frame Protocol (GFP) frame.

14. The method of claim 13, wherein encapsulating includes placing the portions of the Ethernet packet from the destination address portion to the frame check sequence, inclusive, into the payload portion of the Generic Frame Protocol (GFP) frame.

15. The method of claim 9, wherein associating includes:
grouping a plurality of Generic Frame Protocol (GFP) payloads and zero or more GFP Idle frames into a transmission frame; and
adding a Forward Error Correction portion to the transmission frame.

16. The method of claim 9, wherein transmitting includes transmitting the encapsulated payload portion at a rate substantially equal to or less than the line rate of the received Ethernet packet.

17. A method of employing a networking apparatus comprising:
receiving, from another networking apparatus, a transmission frame including at least one encapsulated portion of an Ethernet packet encoded such that one symbol or less is used per bit of information, and an error correction code;
identifying the boundaries of the encapsulated portion of the Ethernet packet(s);
applying the error correction code to the encapsulated portion of the Ethernet packet(s) in order to correct transmission errors, if any; and
recreating at least one Ethernet packet utilizing the encapsulated portion of the Ethernet packet(s).

18. The method of claim 17, further including re-encoding the recreated Ethernet packet such that the recreated Ethernet packet is substantially direct current balanced.

19. The method of claim 17, wherein receiving includes receiving at least one encapsulated portion of an Ethernet packet encapsulated in a Generic Frame Protocol (GFP) Frame, and encoded in an 8-bit code; and
wherein recreating includes extracting the encapsulated Ethernet packet portion from the GFP Frame and re-encoding the recreated Ethernet packet via an 8B/10B encoding scheme.

20. The method of claim 17, wherein applying the error correction code includes applying a forward error correction (FEC) code to a payload portion of the transmission frame, and
wherein the FEC code includes 7 percent or more of the number of bytes of the transmission frame.

21. An apparatus comprising:
means for receiving an Ethernet packet that includes a payload portion;

means for decoding at least the payload portion of the Ethernet packet such that the size of the payload portion is reduced;

means for encapsulating the payload portion such that packet boundaries may be identified;

means for associating an error correction code with the encapsulated payload portion; and means for transmitting the encapsulated payload and error correction code.

22. The apparatus of claim 21, wherein the means for encapsulating comprises means for encapsulating a portion of the Ethernet packet into a payload portion of a Generic Frame Protocol (GFP) frame.

* * * * *